United States Patent
Sugimori et al.

(10) Patent No.: US 12,119,698 B2
(45) Date of Patent: Oct. 15, 2024

(54) CONTROL UNIT, BATTERY PACK, AND POWER SUPPLY DEVICE

(71) Applicant: FDK CORPORATION, Tokyo (JP)

(72) Inventors: Shunichiro Sugimori, Tokyo (JP);
Yusuke Kusagaya, Tokyo (JP);
Takashi Kabasawa, Tokyo (JP)

(73) Assignee: FDK CORPORATION, Tokyo (JP)

( * ) Notice: Subject to any disclaimer, the term of this patent is extended or adjusted under 35 U.S.C. 154(b) by 476 days.

(21) Appl. No.: 17/305,401

(22) Filed: Jul. 7, 2021

(65) Prior Publication Data

US 2022/0021231 A1 Jan. 20, 2022

(30) Foreign Application Priority Data

Jul. 20, 2020 (JP) ................................. 2020-123934

(51) Int. Cl.
*H02J 7/00* (2006.01)

(52) U.S. Cl.
CPC ...... *H02J 7/007182* (2020.01); *H02J 7/0048* (2020.01); *H02J 7/0071* (2020.01)

(58) Field of Classification Search
CPC .. H02J 7/007182; H02J 7/0048; H02J 7/0071; H02J 9/061; H02J 7/0047; H02J 7/0063; H02J 7/0068; H02J 7/00712
See application file for complete search history.

(56) References Cited

U.S. PATENT DOCUMENTS

| | | | | |
|---|---|---|---|---|
| 5,525,888 | A * | 6/1996 | Toya | H01M 50/202 320/113 |
| 5,939,855 | A * | 8/1999 | Proctor | H02J 7/0071 320/132 |
| 9,490,661 | B2 * | 11/2016 | Kabasawa | H02J 9/061 |
| 9,627,920 | B2 * | 4/2017 | Yun | H02J 7/00712 |
| 10,097,035 | B2 * | 10/2018 | Harada | H02J 7/02 |
| 10,673,267 | B2 * | 6/2020 | Saito | H02J 7/007182 |
| 11,271,417 | B2 * | 3/2022 | Lee | H01M 10/443 |
| 2002/0097022 | A1 * | 7/2002 | Saeki | H02J 7/007182 320/125 |
| 2006/0197382 | A1 * | 9/2006 | Chou | H02J 9/061 320/160 |
| 2008/0113691 | A1 * | 5/2008 | Otsuki | H01M 10/44 455/573 |

(Continued)

FOREIGN PATENT DOCUMENTS

| | | |
|---|---|---|
| CN | 105375072 A | 3/2016 |
| CN | 109075606 A | 12/2018 |

(Continued)

OTHER PUBLICATIONS

Extended European Search Report dated Dec. 21, 2021, received for corresponding European Application No. 21185192.8, p. 7.

*Primary Examiner* — M Baye Diao
(74) *Attorney, Agent, or Firm* — Kinney & Lange, P.A.

(57) ABSTRACT

A battery indicator estimates a remaining battery capacity when a controller instructs a driving power source to start the power supply based on a battery voltage detected at a timing when the controller instructs the driving power source to start the power supply. The controller instructs the driving power source to stop the power supply after the discharge of a secondary battery by a charge-discharge circuit is ended and at a timing when a battery voltage being measured by a voltage measurer is stabilized.

7 Claims, 4 Drawing Sheets

(56) References Cited

U.S. PATENT DOCUMENTS

| | | | | |
|---|---|---|---|---|
| 2010/0096922 A1* | 4/2010 | Kishimoto | ............ | H02J 7/0063 |
| | | | | 307/9.1 |
| 2015/0084554 A1* | 3/2015 | Tsuruta | ................. | B25F 5/00 |
| | | | | 318/139 |
| 2015/0349547 A1* | 12/2015 | Jeon | ................. | G01R 31/3648 |
| | | | | 320/134 |
| 2016/0156202 A1* | 6/2016 | Kim | .................. | H02J 7/0014 |
| | | | | 320/134 |
| 2017/0063150 A1* | 3/2017 | Sakamoto | ............ | H02J 7/0013 |

FOREIGN PATENT DOCUMENTS

| | | | | | |
|---|---|---|---|---|---|
| EP | 2597478 B1 | * | 1/2019 | ............ | H02J 7/0031 |
| EP | 3852219 B1 | * | 10/2023 | ............. | B60L 53/00 |
| KR | 102524898 B1 | * | 4/2023 | ............ | H02J 7/0063 |

\* cited by examiner

CONTROL UNIT, BATTERY PACK, AND POWER SUPPLY DEVICE

CROSS-REFERENCE TO RELATED APPLICATION(S)

This application claims priority to Japanese Application No. 2020-123934 filed on Jul. 20, 2020, which is incorporated by reference herein in its entirety.

BACKGROUND

Field

The present disclosure relates to a control unit for controlling the operation of a charge-discharge circuit that charges or discharges a secondary battery and to a battery pack and a power supply device including the control unit.

Description of the Related Art

In general, an electronic device such as a battery pack or a power supply device includes a secondary battery and a battery indicator capable of estimating the remaining battery capacity of the secondary battery. The battery indicator detects a charging current flowing to the secondary battery in the case of charging secondary battery and a discharging current output from the secondary battery in the case of discharging the secondary battery and estimates the remaining battery capacity of the secondary battery based on the charging current and the discharging current.

The battery voltage of the secondary battery is higher during charge and lower during discharge than an open-circuit voltage (OCV), which indicates a battery voltage when charge or discharge is not performed. Further, the battery voltage of the secondary battery has a characteristic of gradually approaching the OCV when the charge and discharge are ended. Here, the remaining battery capacity at the time of power supply to a microcomputer held in the electronic device is estimated based on the battery voltage. The remaining battery capacity is estimated assuming that the battery voltage at this time is the OCV. That is, a problem is that, when the power supply to the microcomputer is cut off and applied again without a time interval after the charge or discharge of the secondary battery, the estimation accuracy of the remaining battery capacity deteriorates.

SUMMARY

A control unit according to the present disclosure is a control unit for controlling the operation of a charge-discharge circuit that charges or discharges a secondary battery, the control unit including: a controller configured to control power supply for causing the charge-discharge circuit to operate; a driving power source that supplies drive power to the controller; a voltage measurer configured to measure a battery voltage of the secondary battery; and a battery indicator configured to estimate a remaining battery capacity of the secondary battery from the battery voltage of the secondary battery measured by the voltage measurer. The battery indicator estimates the remaining battery capacity when the controller instructs the driving power source to start power supply based on the battery voltage detected at a timing when the controller instructs the driving power source to start the power supply. The controller instructs the driving power source to stop the power supply after the discharge of the secondary battery by the charge-discharge circuit is ended and at a timing when the battery voltage measured by the voltage measurer is stabilized.

The battery pack according to the present disclosure includes the control unit according to the present disclosure, the charge-discharge circuit, and the secondary battery.

The power supply device according to the present disclosure includes the control unit according to the present disclosure, the charge-discharge circuit, and the secondary battery.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Hereinafter, a control unit, a battery pack, and a power supply device according to an embodiment will be described with reference to the drawings. Note that the present embodiment is not limited to the content described below but can be implemented with an arbitrary change in the scope where the gist thereof is not changed. The drawings for use in the description of the embodiments schematically show constituent members, are partially emphasized, enlarged, reduced, or omitted for better understanding, and may not accurately show the scale, shape, or the like of the constituent members.

(Configuration)

Figure 1:
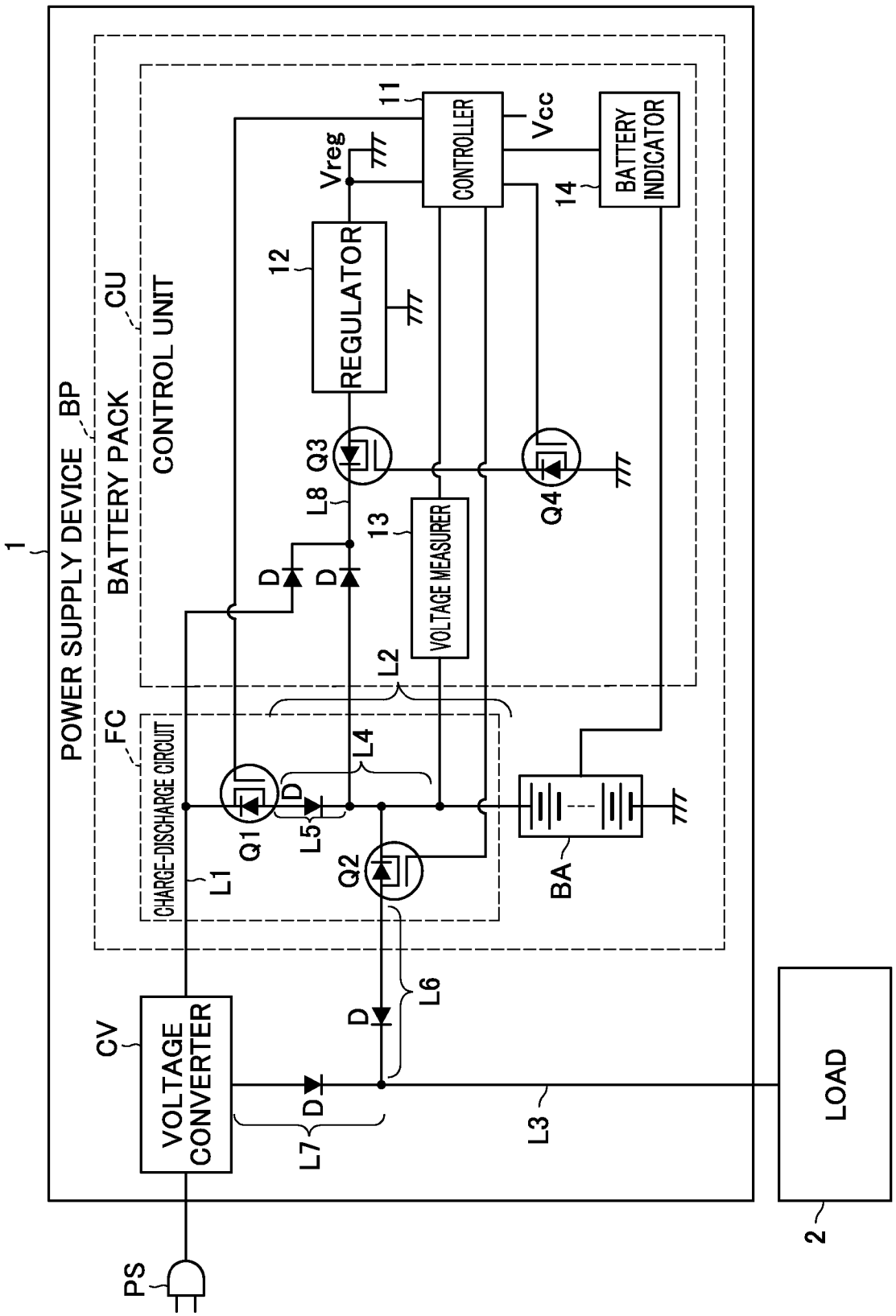
FIG. 1 is a circuit diagram showing a power supply device according to the present embodiment.

FIG. 1 is a circuit diagram showing a power supply device 1 according to the present embodiment. The power supply device 1 shown in FIG. 1 converts power supplied from an external power source PS into power that can be supplied to a load 2 and supplies the power to the load 2. While supplying the power to the load 2, the power supply device 1 charges a secondary battery BA incorporated in the power supply device 1 itself by the power. When the power supply from the external power source PS is stopped due to a power failure or the like, the power supply device 1 discharges the power stored in the secondary battery BA and supplies the power to the load 2. Note that the power supply device 1 according to the present embodiment can charge the secondary battery BA while supplying the power to the load 2.

As shown in FIG. 1, the power supply device 1 according to the present embodiment includes a voltage converter CV and a battery pack BP. The battery pack BP includes a charge-discharge circuit FC and a control unit CU together with the secondary battery BA. The voltage converter CV converts power supplied from the external power source PS into power that can be supplied to the load 2 and supplies the power to the load 2. Also, the voltage converter CV converts the power supplied from the external power source PS into power that can be supplied to the secondary battery BA via the charge-discharge circuit FC and supplies the power to the secondary battery BA.

The charge-discharge circuit FC charges and discharges the secondary battery BA under the control of the control unit CU. The charge-discharge circuit FC in the present embodiment is provided with switching elements Q1, Q2. The switching element Q1 is provided in an electrical path L1 between the voltage converter CV and the secondary battery BA. More specifically, the gate of the switching element Q1 is connected to the controller 11 of the control unit CU to be described later. The drain of the switching element Q1 is connected to the voltage converter CV. The source of the switching element Q1 is connected to the secondary battery BA.

One end of the switching element Q2 is connected to an electrical path L2 between the switching element Q1 and the secondary battery BA, and the other end of the switching element Q2 is connected to an electrical path L3 between the voltage converter CV and the load 2. More specifically, the gate of the switching element Q2 is connected to the controller 11 of the control unit CU to be described later. The drain (the one end) of the switching element Q2 is connected to the electrical path L2. The source (the other end) of the switching element Q2 is connected to the electrical path L3.

The charge-discharge circuit FC in the present embodiment performs the on/off operation of the switching element Q1 or the switching element Q2 under the control of the control unit CU to charge or discharge the secondary battery BA. For example, when charging the secondary battery BA, the charge-discharge circuit FC turns on the switching element Q1 and turns off the switching element Q2. Thus, the power is supplied from the external power source PS to the secondary battery BA via the voltage converter CV and the switching element Q1, and the power is stored into the secondary battery BA. When discharging the secondary battery BA, the charge-discharge circuit FC turns on the switching element Q2 and turns off the switching element Q1. Thus, the power is supplied from the secondary battery BA to the load 2 via the switching element Q2.

The control unit CU controls the operation of the charge-discharge circuit FC. The control unit CU in the present embodiment includes a controller 11, a switching element Q3, a switching element Q4, a regulator 12, a voltage measurer 13, and a battery indicator 14.

The controller 11 includes a predetermined processor as a hardware resource. The controller 11 is connected to a driving power source Vcc that supplies power for driving the controller 11 to the controller 11. The controller 11 is configured to control power supply for causing the charge-discharge circuit FC to operate. As shown in FIG. 1, the controller 11 in the present embodiment is connected to the gates of the switching elements Q1, Q2 in the charge-discharge circuit FC and the gate of the switching element Q4 in the control unit CU. The controller 11 applies a predetermined gate voltage to the gate of each of the switching elements Q1, Q2, Q4 to turn on each of the switching elements Q1, Q2, Q4.

The controller 11 is configured to turn on the switching elements Q3, Q4 at a timing of instructing the driving power source Vcc to start power supply (i.e., the timing of activating the power supply device 1) and to turn off the switching elements Q3, Q4 at a timing of instructing the driving power source Vcc to stop the power supply (i.e., the timing of stopping (shutting down) the power supply device 1). By detecting a voltage Vreg output from the regulator 12, the controller 11 can recognize that the charging operation is being executed. Here, the regulator 12 is connected in parallel to the switching element Q1 via the switching element Q3 and is configured to keep constant the power supplied from the voltage converter CV to the secondary battery BA.

Here, the gate of the switching element Q3 is connected to the drain of the switching element Q4. The drain of the switching element Q3 is connected to an electrical path L4 between the source of the switching element Q1 and the connection point of the electrical path L2 to which the drain of the switching element Q2 is connected. The source of the switching element Q3 is connected to the regulator 12. The gate of the switching element Q4 is connected to the controller 11 as described above. The drain of the switching element Q4 is connected to the gate of the switching element Q3 as described above. The source of the switching element Q4 is grounded. That is, by the controller 11 applying a predetermined gate voltage to the gate of the switching element Q4, the switching element Q4 is turned on. Further, by turning on the switching element Q4, a gate voltage is applied to the gate of the switching element Q3. Thereby, the switching element Q3 is turned on.

The voltage measurer 13 is connected in parallel to the secondary battery BA and is configured to measure the battery voltage of the secondary battery BA. The battery indicator 14 is configured to estimate the remaining battery capacity of the secondary battery BA from the battery voltage of the secondary battery BA measured by the voltage measurer 13. For example, the battery indicator 14 in the present embodiment estimates a remaining battery capacity when the controller 11 instructs the driving power source Vcc to start power supply based on the battery voltage detected at a timing when the controller 11 instructs the driving power source Vcc to start the power supply. Further, the battery indicator 14 is configured to display the remaining battery capacity. For example, the battery indicator 14 displays the remaining battery capacity on a display device (not shown) such as a display incorporated in the battery indicator 14 itself or an external display.

Here, in the power supply device 1 according to the present embodiment, a diode D is provided in each of: an electrical path L5 between the source of the switching element Q1 and the connection point of the electrical path L4 to which the drain of the switching element Q3 is connected; an electrical path L6 between the source of the switching element Q2 and the connection point of the electrical path L3 to which the source of the switching element Q2 is connected; an electrical path L7 between the voltage converter CV and the connection point of the electrical path L3 to which the source of the switching element Q2 is connected; and an electrical path L8 between the switching element Q1 and the switching element Q3, thereby preventing the reverse flow of the current in each path.

(Relationship Between Battery Voltage of Secondary Battery and On/Off of Each Switching Element)

Figure 2:
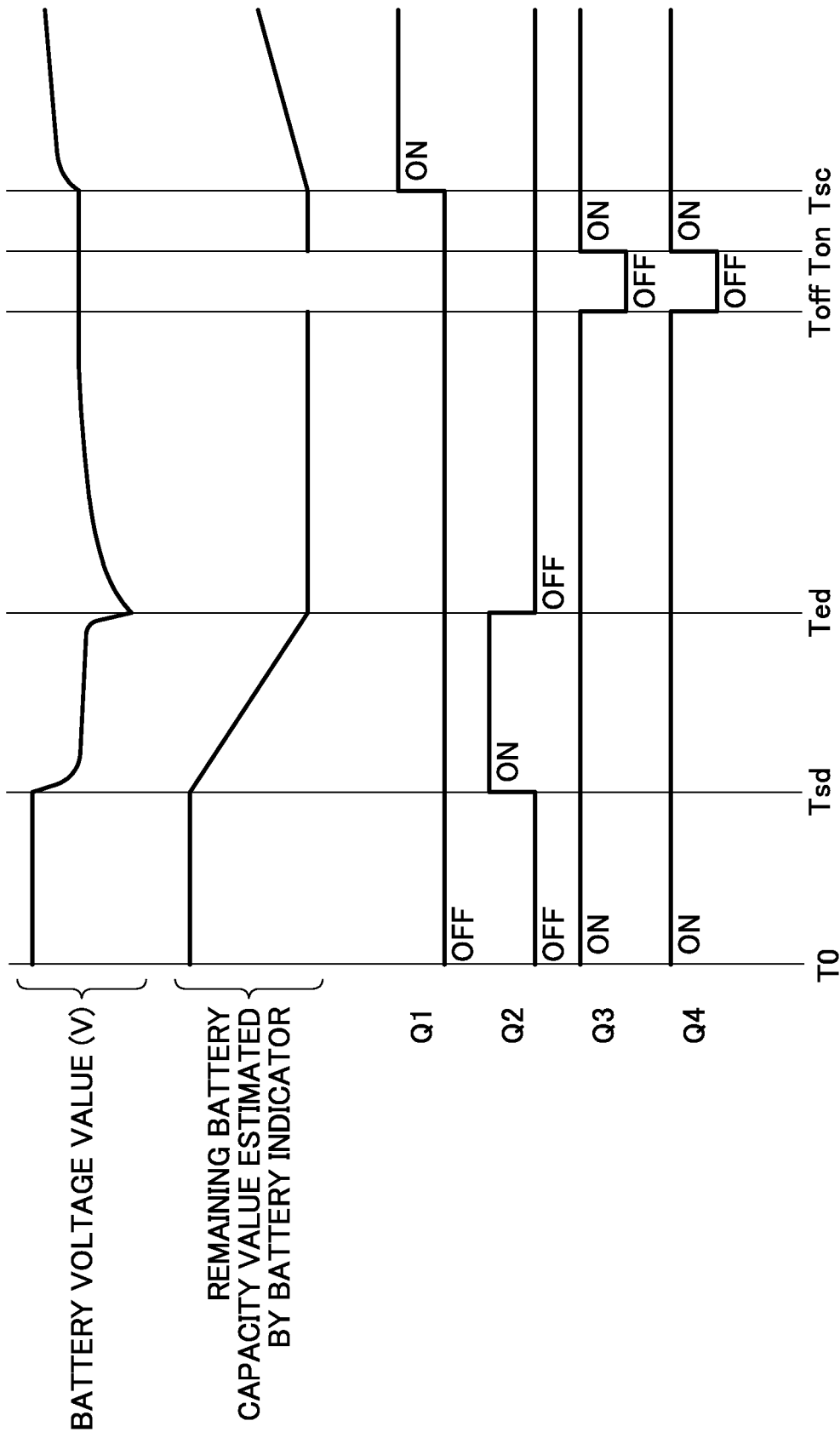
FIG. 2 is an example of a timing chart in the case of charging the secondary battery after discharging the secondary battery in the power supply device shown in FIG. 1.

Next, the relationship between the battery voltage of the secondary battery BA and the on/off-state of each switching element will be described in detail with reference to FIG. 2. FIG. 2 is an example of a timing chart in the case of charging the secondary battery BA after discharging the secondary battery BA in the power supply device 1 shown in FIG. 1. Note that the power supply device 1 shown in FIG. 1 discharges the secondary battery BA in a fully charged state in accordance with the timing chart shown in FIG. 2, stops operation after discharging the secondary battery BA, and charges the secondary battery BA after being activated again. In the timing chart shown in FIG. 2, the axis of ordinates represents the battery voltage value of the secondary battery BA or the remaining battery capacity value estimated by the battery indicator 14 and the status of each switching element, and the axis of abscissas represents time. It is assumed that the power supply device 1 according to the present embodiment has been activated at the start of the timing chart shown in FIG. 2 (i.e., time $T_0$). That is, it is assumed that the switching elements Q3, Q4 have been turned on by the controller 11 at time $T_0$.

First, as shown in FIG. 2, the power supply device 1 according to the present embodiment neither charges nor discharges the secondary battery BA in a period from above-mentioned time $T_0$ until immediately before time $T_{sd}$ to start the discharge of the secondary battery BA. In this period, the battery voltage value of the secondary battery BA and the remaining battery capacity value estimated by the battery indicator 14 are constant.

The controller 11 of the control unit CU turns off the switching elements Q1, Q2. As described above, the controller 11 maintains the switching elements Q3, Q4 in the on-state.

Next, as shown in FIG. 2, in a period from above-mentioned time $T_{sd}$ to time $T_{ed}$ when the discharge of the secondary battery BA is ended, the power supply device 1 according to the present embodiment starts discharging the secondary battery BA, discharges the secondary battery BA just in the period, and then ends the discharge of the secondary battery BA. In this period, due to the discharge characteristics of the secondary battery BA, the battery voltage value of the secondary battery BA rapidly drops when the secondary battery BA is discharged, and the battery voltage value slowly drops in the middle of the period, and rapidly drops again when the discharge of the secondary battery BA is ended. The remaining battery capacity value estimated by the battery indicator 14 linearly decreases.

At above-mentioned time $T_{sd}$, the controller 11 turns on the switching element Q2, maintains the switching element Q1 in the off-state, and maintains the switching elements Q3, Q4 in the on-state. The controller 11 maintains the switching element Q1 in the off-state and maintains the switching elements Q2, Q3, Q4 in the on-state in a period immediately after above-mentioned time $T_{sd}$ until immediately before time $T_{ed}$. At above-mentioned time $T_{ed}$, the controller 11 turns off the switching element Q2, maintains the switching element Q1 in the off-state, and maintains the switching elements Q3, Q4 in the on-state.

Next, as shown in FIG. 2, the power supply device 1 according to the present embodiment does not discharge the secondary battery BA and maintains the power supply to the charge-discharge circuit FC in a period immediately after above-mentioned time $T_{ed}$ until time $T_{off}$ at which the control 11 instructs the driving power source Vcc to stop the power supply (i.e., the time at which the power supply device 1 is stopped). After maintaining the power supply to the charge-discharge circuit FC, the power supply device 1 stops the power supply to the charge-discharge circuit FC, and the controller 11 instructs the driving power source Vcc to stop the power supply. In this period, the battery voltage value of the secondary battery BA gradually increases, and at the end of the period, the battery voltage value becomes constant. Further, the remaining battery capacity value estimated by the battery indicator 14 is constant.

Here, as a reason why the remaining battery capacity value estimated by the battery indicator 14 is constant, the estimation method for the battery voltage by the battery indicator 14 is considered. The battery indicator 14 is configured to estimate the remaining battery capacity of the secondary battery BA from the battery voltage of the secondary battery BA. That is, the remaining battery capacity does not increase or decrease unless the secondary battery BA is charged or discharged. Hence the remaining battery capacity value estimated by the battery indicator 14 is constant.

In the period immediately after above-mentioned time $T_{ed}$ until immediately before time $T_{off}$, the controller 11 maintains the switching elements Q1, Q2 in the off-state and maintains the switching elements Q3, Q4 in the on-state. At above-mentioned time $T_{off}$, the controller 11 maintains the switching elements Q1, Q2 in the off-state and turns off the switching elements Q3, Q4. That is, the controller 11 in the present embodiment instructs the driving power source Vcc to stop the power supply after the discharge of the secondary battery BA by the charge-discharge circuit FC is ended and at a timing when the battery voltage being measured by the voltage measurer 13 is stabilized. In the power supply device 1 according to the present embodiment, the timing at which the battery voltage of the secondary battery BA is stabilized is the timing at which the rate of change in the battery voltage per time falls below a predetermined threshold value.

Next, as shown in FIG. 2, for example, in a period immediately after above-mentioned time $T_{off}$ until time $T_{on}$ at which the controller 11 instructs the driving power source Vcc to start power supply, (i.e., the time at which the power supply 1 is activated), the power supply device 1 according to the present embodiment stops operation by the controller 11 instructing the driving power source Vcc to stop the power supply. After stopping the operation, the power supply device 1 starts the operation by the controller 11 instructing the driving power source Vcc to start power supply and starts the power supply from the control unit CU to the charge-discharge circuit FC. In this period, the battery voltage value of the secondary battery BA and the remaining battery capacity value estimated by the battery indicator 14 are constant.

The controller 11 maintains the switching elements Q1, Q2, Q3, Q4 in the off-state in the period immediately after above-mentioned time $T_{off}$ until immediately before time $T_{on}$. The controller 11 maintains the switching elements Q1, Q2 in the off-state and turns on the switching elements Q3, Q4 at above-mentioned time $T_{on}$.

Next, as shown in FIG. 2, for example, the power supply device 1 according to the present embodiment supplies power from the control unit CU to the charge-discharge circuit FC in a period immediately after above-mentioned time $T_{on}$ until time $T_{sc}$ to charge the secondary battery BA and charges the secondary battery BA after supplying power from the control unit CU to the charge-discharge circuit FC. In this period, the battery voltage value of the secondary battery BA and the remaining battery capacity value estimated by the battery indicator 14 are constant.

In the period immediately after above-mentioned time $T_{on}$ until immediately before time $T_{sc}$, the controller 11 maintains the switching elements Q1, Q2 in the off-state and maintains the switching elements Q3, Q4 in the on-state. At above-mentioned time $T_{sc}$, the controller 11 turns on the switching element Q1, maintains the switching element Q2 in the off-state, and maintains the switching elements Q3, Q4 in the on-state.

Finally, as shown in FIG. 2, the power supply device 1 according to the present embodiment continues to charge the secondary battery BA after above-mentioned time $T_{sc}$. In this period, the battery voltage value of the secondary battery BA rapidly rises immediately after the secondary battery BA is charged and then gradually rises. The remaining battery capacity value estimated by the battery indicator 14 linearly increases.

The controller 11 maintains the switching element Q1, Q3, Q4 in the on-state and maintains the switching element Q2 in the off-state after above-mentioned time $T_{sc}$.

CONCLUSION

As described above, in the power supply device 1 according to the present embodiment, the controller 11 of the control unit CU stops the power supply to the charge-discharge circuit FC after the discharge of the secondary battery BA by the charge-discharge circuit FC is ended and at a timing when a battery voltage being measured by a voltage measurer 13 is stabilized. The battery indicator 14 of the control unit CU estimates a remaining battery capacity when the controller 11 instructs the driving power source Vcc to start the power supply based on a battery voltage detected at a timing when the controller 11 instructs the driving power source Vcc to start the power supply.

Figure 3:
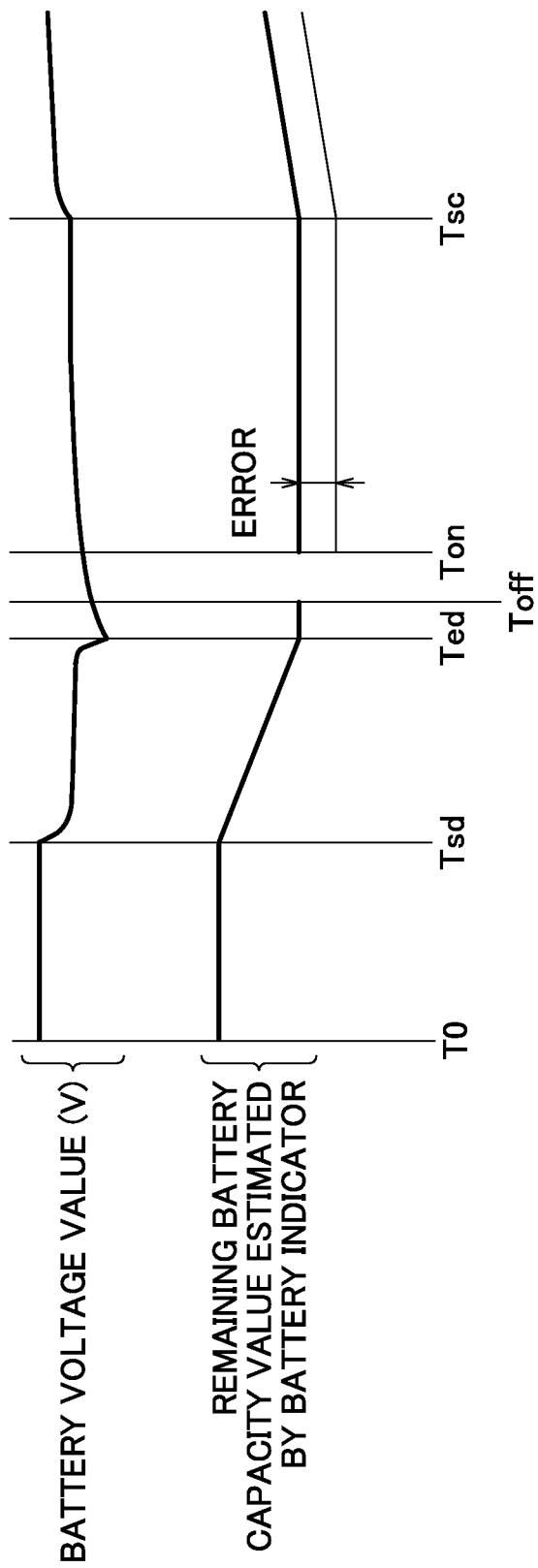
FIG. 3 is a diagram for explaining the effect of the power supply device according to the present embodiment.

For example, as shown in FIG. 3, consider that, immediately after the discharge of the secondary battery BA is stopped, the driving power source Vcc is instructed to stop the power supply at a timing when the battery voltage of the secondary battery BA is not stable (i.e., the timing when the rate of change in the battery voltage per time is large.). In this case, due to the influence of the fluctuation of the battery voltage, the battery voltage continues to fluctuate even after the discharge of the secondary battery is ended, so that the estimated remaining battery capacity becomes low as indicated by a thin line in FIG. 3, and an error occurs in the remaining battery capacity value, although the remaining battery capacity value should be estimated as indicated by a thick line in FIG. 3.

On the other hand, in the power supply device 1 according to the present embodiment, the controller 11 of the control unit CU instructs the driving power source Vcc to stop the power supply at a timing when the battery voltage measured by the voltage measurer 13 is stabilized in consideration of the fluctuation of the battery voltage. As a result, the power supply device 1 according to the present embodiment estimates the remaining battery capacity in consideration of the above error and can thus accurately estimate the remaining battery capacity of the secondary battery BA. That is, the power supply device 1 according to the present embodiment can improve the estimation accuracy of the remaining battery capacity.

Figure 4:
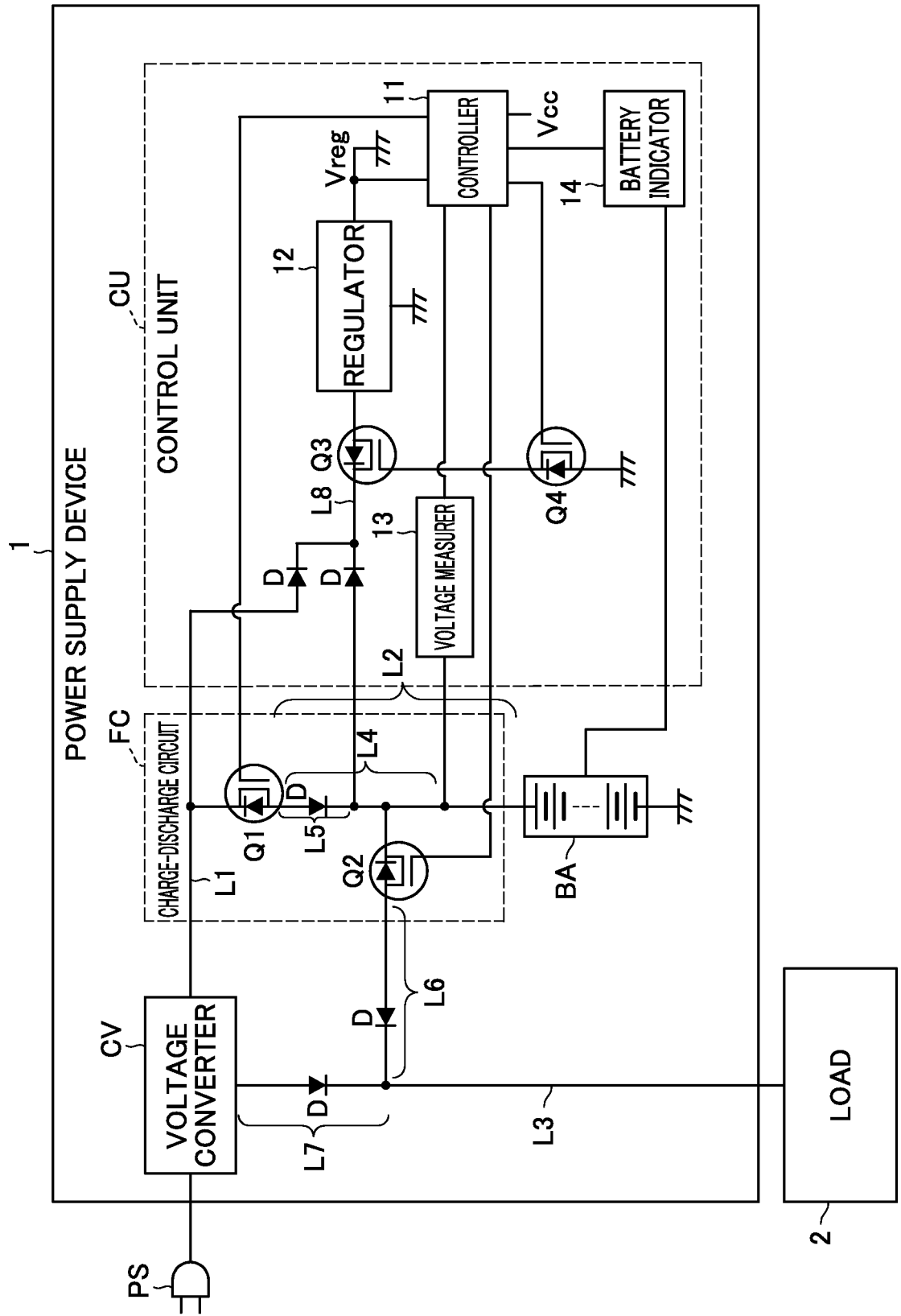
FIG. 4 is a circuit diagram showing a power supply device according to a modified example.

As shown in FIG. 1, the control unit CU in the present embodiment is incorporated in the battery pack BP. However, the control unit CU in the present embodiment is not limited thereto. For example, as shown in FIG. 4, the control unit CU in the present embodiment may be incorporated as a component of the power supply device 1.

In the power supply device 1 according to the present embodiment, the timing at which the battery voltage of the secondary battery BA is stabilized is a timing at which the rate of change in the battery voltage per time falls below a predetermined threshold value. However, the power supply device 1 according to the present embodiment is not limited thereto. For example, in the power supply device 1 according to the present embodiment, the timing at which the battery voltage is stabilized may be a timing at which a preset time has elapsed after the discharge is ended. In this case, the set time is from 30 minutes to two hours. Alternatively, the timing at which the battery voltage is stabilized may be a timing at which the battery voltage changes by a predetermined value with respect to the battery voltage when the discharge is ended.

In the present embodiment, the power that can be supplied to the load 2 and the power that can be supplied to the secondary battery BA are the same, as can be seen from the fact that the paths are shared. However, the power supply device 1 according to the present embodiment is not limited thereto. In the present embodiment, an inverter may be further provided in the power supply device 1 so that power converted to a desired voltage and stored into the secondary battery BA can be output.

The external power source PS in the present embodiment may be a household power source or a commercial power source. The external power source PS may be a power source capable of supplying DC power or a power source capable of supplying AC power. That is, the power supply device 1 according to the present embodiment can appropriately change the internal configuration in accordance with the type of the external power source PS and the power available in the load 2. At this time, the voltage converter CV in the present embodiment can be changed appropriately in accordance with the type of the external power source PS and the power available in the load 2. For example, the voltage converter CV in the present embodiment may be a rectifier (AC-to-DC converter) or a DC-to-DC converter.

Note that the secondary battery BA in the present embodiment is a battery generally known, for example, a lithium-ion battery or a lead storage battery. The load 2 in the present embodiment is assumed to be, for example, a personal computer, a server, a storage device, or other devices that are required to operate for a certain period of time when the power supply from the external power source PS is stopped.

The term "predetermined processor" used in the above description means, for example, a dedicated or general-purpose processor such as a central processing unit (CPU), a micro processing unit (MPU), or a graphics processing unit (GPU), an application-specific integrated circuit (ASIC), a programmable logic device (e.g., a simple programmable logic device (SPLD), a complex programmable logic device (CPLD), a field-programmable gate array (FPGA)), or the like. Each component of the present embodiment is not limited to a single processor but may be achieved by a plurality of processors. A plurality of components may be achieved by a single processor.

While the embodiment has been described above, the embodiments have been presented as examples and are not intended to limit the scope of the invention. The new embodiment can be implemented in various other forms, and various omissions, substitutions, and changes can be made without departing from the scope of the invention. The embodiment and its modification are included in the scope and the gist of the invention and are also included in the scope of the invention described in the claims and its equivalence.

What is claimed is:

1. A control unit for controlling operation of a charge-discharge circuit that charges or discharges a secondary battery, the control unit comprising:
    a controller and a plurality of switching elements configured to control power supply for causing the charge-discharge circuit to operate;
    a driving power source that supplies drive power to the controller;
    a voltage measurer configured to measure a battery voltage of the secondary battery; and a battery indicator configured to estimate a remaining battery capacity of the secondary battery from the battery voltage of the secondary battery measured by the voltage measurer, wherein:

the battery indicator estimates the remaining battery capacity when the controller turns on the plurality of switching elements to start power supply from the control unit to the charge-discharge circuit based on the battery voltage detected at a timing when the controller turns on the plurality of switching elements to start the power supply from the control unit to the charge-discharge circuit, and the controller turns off the plurality of switching elements to stop the power supply from the control unit (CU) to the charge-discharge circuit after the discharge of the secondary battery by the charge-discharge circuit is ended and at a timing when the battery voltage measured by the voltage measurer is stabilized.

2. The control unit according to claim 1, wherein the timing at which the battery voltage is stabilized is the timing at which a rate of change in the battery voltage per time falls below a predetermined threshold value.

3. The control unit according to claim 1, wherein the timing at which the battery voltage is stabilized is the timing at which a preset time elapses after the discharge is ended.

4. The control unit according to claim 3, wherein the preset time is from 30 minutes to two hours.

5. The control unit according to claim 1, wherein the timing at which the battery voltage is stabilized is the timing at which the battery voltage changes by a predetermined value with respect to the battery voltage when the discharge is ended.

6. A battery pack comprising:

a secondary battery;

a charge-discharge circuit that charges or discharges the secondary battery; and a control unit that controls operation of the charge-discharge circuit;

wherein:

the control unit includes:

a controller and a plurality of switching elements configured to control power supply for causing the charge-discharge circuit to operate;

a driving power source that supplies drive power to the controller;

a voltage measurer configured to measure a battery voltage of the secondary battery; and a battery indicator configured to estimate a remaining battery capacity of the secondary battery from the battery voltage of the secondary battery measured by the voltage measurer, the battery indicator estimates the remaining battery capacity when the controller turns on the plurality of switching elements to start power supply from the control unit to the charge-discharge circuit based on the battery voltage detected at a timing when the controller turns on the plurality of switching elements to start the power supply from the control unit to the charge-discharge circuit, and the controller turns off the plurality of switching elements to stop the power supply from the control unit to the charge-discharge circuit after the discharge of the secondary battery by the charge-discharge circuit is ended and at a timing when the battery voltage measured by the voltage measurer is stabilized.

7. A power supply device comprising:

a secondary battery;

a charge-discharge circuit that charges or discharges the secondary battery;

a voltage converter that converts power supplied from an external power source; and a control unit that controls the charge-discharge circuit;

wherein:

the control unit includes:

a controller and a plurality of switching elements configured to control power supply for causing the charge-discharge circuit to operate;

a driving power source that supplies drive power to the controller;

a voltage measurer configured to measure a battery voltage of the secondary battery; and a battery indicator configured to estimate a remaining battery capacity of the secondary battery from the battery voltage of the secondary battery measured by the voltage measurer, the battery indicator estimates the remaining battery capacity when the controller turns on the plurality of switching elements to start power supply from the control unit to the charge-discharge circuit based on the battery voltage detected at a timing when the controller turns on the plurality of switching elements to start the power supply from the control unit to the charge-discharge circuit, and the controller turns off the plurality of switching elements to stop the power supply from the control unit to the charge-discharge circuit after the discharge of the secondary battery by the charge-discharge circuit is ended and at a timing when the battery voltage measured by the voltage measurer is stabilized.

* * * * *